United States Patent
Wood et al.

(10) Patent No.: US 7,417,583 B2
(45) Date of Patent: Aug. 26, 2008

(54) METHODS AND APPARATUS FOR PROVIDING TARGET ALTITUDE ESTIMATION IN A TWO DIMENSIONAL RADAR SYSTEM

(75) Inventors: Thomas E. Wood, Portsmouth, RI (US); Robert S. Ager, Tiverton, RI (US); Richard B. Fleury, Bristol, RI (US); Gregory D. Heuer, Middletown, RI (US)

(73) Assignee: Raytheon Company, Waltham, MA (US)

( * ) Notice: Subject to any disclaimer, the term of this patent is extended or adjusted under 35 U.S.C. 154(b) by 123 days.

(21) Appl. No.: 11/554,064

(22) Filed: Oct. 30, 2006

(65) Prior Publication Data

US 2008/0169967 A1 Jul. 17, 2008

(51) Int. Cl.
*G01S 13/42* (2006.01)
*G01S 13/72* (2006.01)
(52) U.S. Cl. .................... 342/123; 342/41; 342/140
(58) Field of Classification Search ................ 342/41, 342/120–123, 140
See application file for complete search history.

(56) References Cited

U.S. PATENT DOCUMENTS

| | | | | |
|---|---|---|---|---|
| 2,497,913 A | * | 2/1950 | Rines ........................ 342/123 |
| 3,582,626 A | * | 6/1971 | Stansbury ................... 701/301 |
| 4,649,390 A | * | 3/1987 | Andrews et al. ............ 342/140 |
| 4,961,075 A | * | 10/1990 | Ward .......................... 342/140 |
| 6,314,366 B1 | | 11/2001 | Farmakis et al. |
| 6,690,296 B2 | | 2/2004 | Corwin et al. |
| 6,776,336 B2 | * | 8/2004 | Bowen ....................... 235/412 |
| 2007/0216566 A1 | * | 9/2007 | Wood ........................ 342/41 |
| 2007/0222665 A1 | * | 9/2007 | Koeneman .................. 342/29 |

OTHER PUBLICATIONS

The estimation of target motion parameters from cpa time measurements in a field of acoustic sensors F.M. Dommermuth J. Acoust. Soc. Am. 83 (4), Apr. 1988 p. 1476-1480.*

* cited by examiner

*Primary Examiner*—Thomas H. Tarcza
*Assistant Examiner*—Cassi Galt
(74) *Attorney, Agent, or Firm*—Daly, Crowley, Mofford & Durkee, LLP (57) ABSTRACT

Method and apparatus to track a contact using a sensor in a two-dimensional radar system, determine a closest point of approach (CPA) for the contact, determine a time to closest point of approach (TCPA) for the contact, and estimate an altitude for the contact from the closest point of approach (CPA) and a cross line of sight distance during the time to closest point of approach (TCPA).

20 Claims, 6 Drawing Sheets

METHODS AND APPARATUS FOR PROVIDING TARGET ALTITUDE ESTIMATION IN A TWO DIMENSIONAL RADAR SYSTEM

BACKGROUND

As is known in the art, conventional maritime radars for shipboard navigation and for coastal surveillance (e.g., land-based Vessel Tracking Systems (VTS)) detect and measure the position of ships and other discrete contacts in a two-dimensional space. This space is typically idealized as a local-level (tangent) plane to the Earth coordinatized in natural radar polar coordinates of range R and true azimuth A or in cartesian coordinates (x,y) with positive x pointing in an Easterly direction and positive y pointing North. When these radars are also configured with Automatic Radar Plotting Aids (ARPA), the position of a contact is tracked over time, and a velocity vector is derived.

Shipboard ARPA radars are used to automatically alert the ship's watch of collision potentials by automatically detecting and tracking other ships and generating an alert under certain conditions involving the relative motion of ownship and the contact under track by the radar. By assuming both ownship and the contact under track will keep their velocities constant, it is possible to compute a Closest Point of Approach (CPA) and a Time until Closest Point of Approach (TCPA). If both CPA and TCPA are smaller than selected limits, then a collision potential alert is issued.

SUMMARY

The present invention provides methods and apparatus for two-dimensional radar systems, such as shipboard navigational radar systems, to estimate altitudes for airborne targets, such as aircraft, With this arrangement, it can be determined whether radar contacts present a potential threat based on selected criteria. While exemplary embodiments are primarily shown and described in conjunction with two-dimensional shipboard radar systems, e.g., navigational radar systems, it is understood that the invention is applicable to two-dimensional radar systems in general for which it is desirable to estimate an altitude for a radar contact.

In one aspect of the invention, a method comprises tracking a contact using a sensor in a two-dimensional radar system, determining a closest point of approach (CPA) for the contact, determining a time to closest point of approach (TCPA) for the contact, and estimating an altitude for the contact from the closest point of approach (CPA) and a cross line of sight distance during the time to closest point of approach (TCPA).

In another aspect of the invention, a system comprises a two-dimensional radar system having a sensor to detect contacts, and a processing module to track a contact using a sensor in a two-dimensional radar system, determine a closest point of approach (CPA) for the contact, determine a time to closest point of approach (TCPA) for the contact, and estimate an altitude for the contact from the closest point of approach (CPA) and a cross line of sight distance during the time to closest point of approach (TCPA).

In a further aspect of the invention, an article comprises a storage medium having stored thereon instructions that when executed by a machine result in the following: tracking a contact using a sensor in a two-dimensional radar system, determining a closest point of approach (CPA) for the contact, determining a time to closest point of approach (TCPA) for the contact, estimating an altitude for the contact from the closest point of approach (CPA) and a cross line of sight distance during the time to closest point of approach (TCPA).

BRIEF DESCRIPTION OF THE DRAWINGS

The foregoing features of this invention, as well as the invention itself, may be more fully understood from the following description of the drawings in which.

DETAILED DESCRIPTION

In general, the present invention provides methods and apparatus for identifying airborne threats in a two-dimensional (2D) radar system, such as shipboard navigational radar systems. In exemplary embodiments, altitude estimates are provided for radar contacts, such as aircraft. In view of the threat of terrorism against ships, it is desirable to use 2D maritime radars as wide area surveillance sensors and early warning systems against a larger class of threats. 2D navigational radars are suitable for this role, for example because they are licensed for use in international ports and waterways via the treaty for Safety Of Life At Sea (SOLAS) and the specification of the International Maritime Organization (IMO). To counter a surface terrorist threat, such as a ship, in one embodiment the offending track information is sent to a command and control or combat system from which a human operator may determine a need to engage the threat.

As part of the engagement decision, in an exemplary embodiment, the operator of a combat system may choose to 'look' at the threat using additional sensors such as Electro-Optical or Infrared (FOIR) cameras. To shorten the time it takes to respond to a threat, it is desirable to have the combat system automatically use the ARPA track to cue the EOIR camera to the surface threat.

It is understood that in conventional systems when the threat is a low, slow aircraft, standard maritime radars may still detect and track the contact, but the combat system will suppose the track's position to be on the sea surface when, in fact, the aircraft may be a mile high. In that condition, when the combat system tries to cue the EOIR camera, the camera may not find the threat because it has a Field Of View (FOV) that is too narrow. One analogy is that the FOV for the EOIR camera is like looking through a straw. In such a case, the human operator assumes the radar has a false track and ignores the threat because nothing at the reported bearing shows up on the sea surface in the camera FOV. While the operator may locate the threat, valuable time is lost while the operator manually directs the cameras in search of the threat.

By providing altitude estimates for potential threats, the inventive methods and apparatus provide a mechanism to locate targets in three dimensions in a 2D radar system. Exemplary embodiments of the invention are suitable for navigational radars that can be aboard a ship or have a static location.

Figure 1:
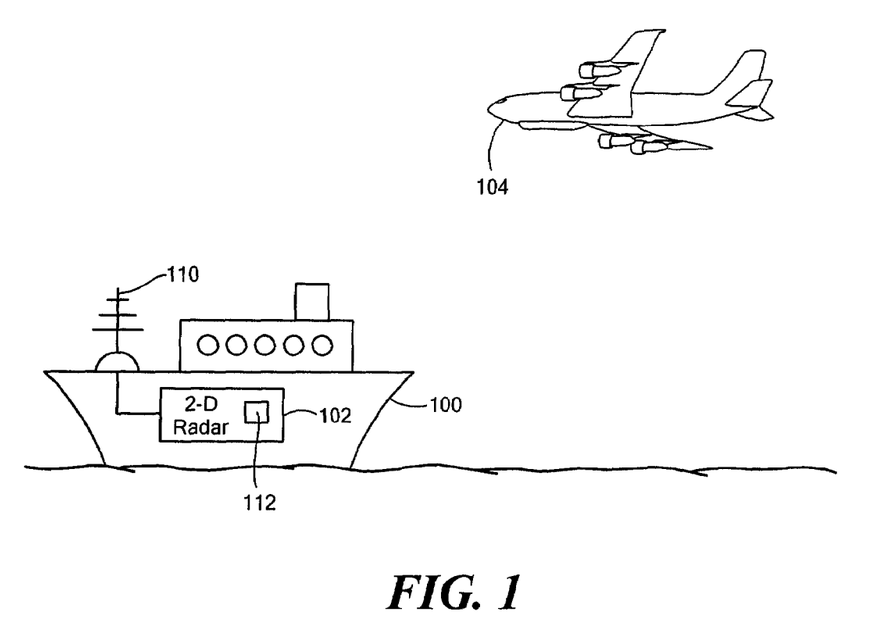
FIG. 1 shows a two-dimensional radar system that can estimate altitude for a radar contact in accordance with exemplary embodiment of the invention.
Figure 2:
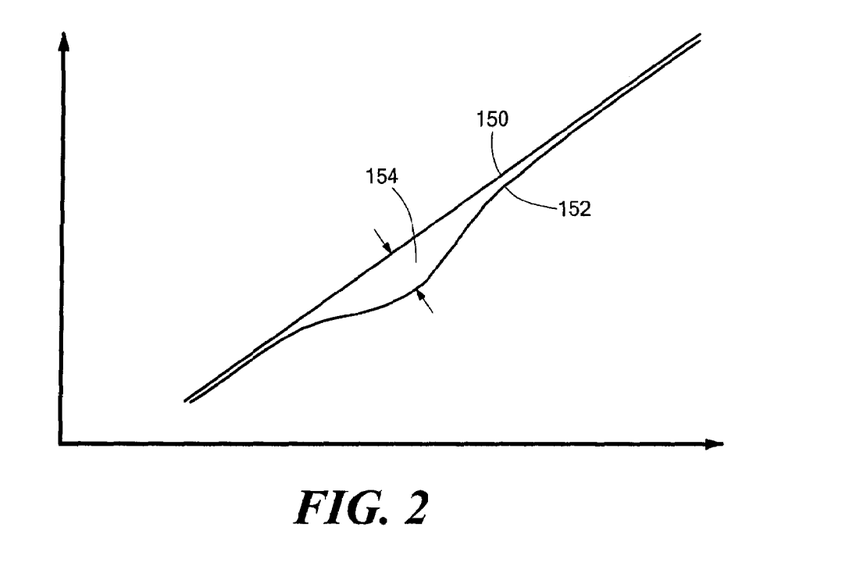
FIG. 2 is a graphical depiction showing a track with zero altitude and a track with relatively large altitude.

FIG. 1 shows a surface vehicle 100, shown as a ship, having a two-dimensional (2D) navigational radar 102 to provide altitude estimation for a target 104, shown as an aircraft, in accordance with exemplary embodiments of the invention. In general, the radar system 102 estimates the altitude of the aircraft 104 by identifying a deviation from a track for a surface target. FIG. 2 shows the track history for a first target having a first track 150 having the same altitude as a 2D radar in the form of a straight line. A second target having a second track 152 deviates from the first track 150 so that a 'bulge' 154 is generated. While the path of the first and second targets are similar, the second target has an altitude with respect to the 2D radar that generates, and corresponds to, the bulge 154 of the second track 152. The characteristics of the bulge 154 can be used to estimate a height of the second target.

Similar to assumptions for computing CPA and TCPA, one can assume that a two dimensional tracking sensor (e.g., ARPA radar) and a discrete contact (e.g., low, slow aircraft) are moving with constant velocities. If the motion is such that the aircraft will eventually fly directly over the tracking sensor, the CPA is the contact altitude. Altitude estimation is determined by a correction to CPA in general situations when the relative motion will not place the contact directly over the radar.

In an exemplary embodiment, the correction term involves what is referred to as "Cross Line Of Sight Distance Traveled During TCPA". Denoting this distance by X, one can estimate the contact altitude h by the Pythagorean Theorem as:

$$h=\sqrt{CPA^2-x^2}$$

The distance X can then be estimated in a number of ways, as described below. Note that if the contact is moving away from the sensor, then the mathematical formula for TCPA results in a negative time, for collision avoidance purposes—in such cases, the system usually declares CPA equal to present range (distance) and resets TCPA to zero. If this convention was followed, boats traveling away would be considered to be flying in the air. Thus, in an exemplary embodiment, a negative TCPA is used as one criterion for selecting the tracks for which an altitude estimate should be determined.

While exemplary embodiments of the invention are primarily shown and described in conjunction with 2D navigational radars, it is understood that the invention is applicable to 2D radars in general in which it is desirable to obtain information for a target in a third dimension. FIG. 1 shows and exemplary shipboard navigational radar 102 having an antenna 110 to receive radar return signals for processing by a signal processing module 112. As will be readily appreciated by one of ordinary skill in the art, the number, type and location of transmit, receive, and transceiver antennas, can vary to meet the needs of particular application.

Figure 3:
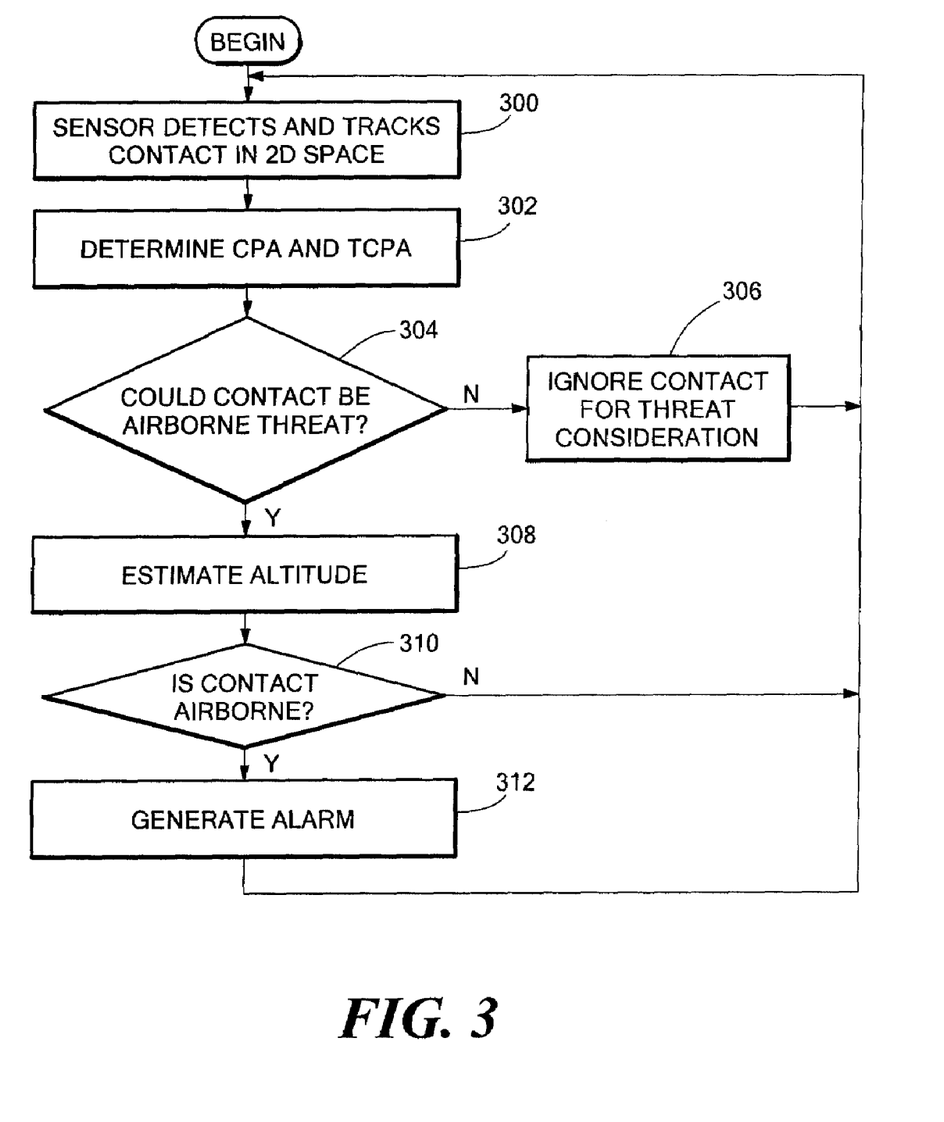
FIG. 3 is a flow diagram showing an exemplary sequence of step for estimating altitude in a two-dimensional radar system.

FIG. 3 shows an exemplary sequence of steps to provide altitude estimates for tracks in a 2 D radar in accordance with an exemplary embodiment of the invention. In step 300, a sensor detects and tracks a contact in 2 D space and in step 302 the CPA and TCPA for the tracks are determined, which can be performed in a conventional manner. In step 304, it is determined whether certain conditions exist indicating an airborne threat is present. Exemplary conditions include contact velocity, CPA, TCPA, whether a square of the Cross Line Of Sight Distance Traveled During TCPA is greater than a square of the CPA by more than a predetermined amount.

If it was determined than an airborne threat is not present, then the track is ignored in step 306. If an airborne threat may be present, in step 308 an altitude for the track is estimated. In step 310, it is determined whether the contact is airborne or not based upon the altitude estimate. If the contact is airborne, an alert can be generated in optional step 312.

It is understood that the computation of TCPA and CPA is well known to one of ordinary skill in the art. Briefly, a sensor has a position vector Po (in 2 D space) at some time (now) and its velocity vector (assumed constant) is V. At any time in the future (or past), the sensor position in 2 D space is P(t)=Po+tV. Similarly, there is a contact initial position $po^T$ vector and a constant contact velocity vector $V^T$. Then, at any time, the contact position is $P^T(t)=po^T+tV^T$. The vector $D(t)=P^T(t)$-P(t) is the line of sight vector from the sensor to the contact. The contact range R(t) can be found as $R^2(t)=D(t) \cdot D(t)$, where "•" denotes the standard vector scalar product or "dot" product.

Since smooth functions will achieve a minimum when their derivative vanishes, one can find the time t=TCPA at which the contact range will be a minimum by setting $R^1(t)=0$ and solving for t. Using the chain rule and the product rule for vector dot products, we want to solve $$0=2R(TCPA)R'(TCPA)=2D(t) \cdot D(t)=2D(TCPA) \cdot (V^T-V)$$

One can trivially cancel the factor of 2, and get $$0=D(TCPA) \cdot (V^T-V)=((Po^T-Po)+TCPA(V^T-V)) \cdot (V^T-V),$$

so $$TCPA = \frac{(Po^T - Po) \cdot (V - V^T)}{\|V - V^T\|^2}$$

It then follows that CPA is the value R(TCPA). Note that TCPA is not defined if the relative velocity is zero. In that case, either both the sensor and contact are stationary, or they are moving in parallel at the same speed. In neither of these cases, does the contact present a threat to collide with the sensor.

Before estimating an altitude for a contact, some checks can be made to determine whether it is appropriate to determine an estimate. For example, if TCPA>0, then the contact is closing on the sensor and is of further interest for altitude evaluation. However, if TCPA is large, for example hours away, there is no threat of imminent collision, so altitude evaluation of such a contact may be given a low priority.

If CPA is relatively large, it may not be necessary to estimate the contact altitude. Such a contact is far away and will stay far away unless it maneuvers. In one embodiment, the term "large" has a selected value to provide a configurable parameter based on the risk aversion and/or other factors. However, any limit on CPA should be large enough to include altitudes commonly used by low, slow flying aircraft, say, around 10,000 feet. In one embodiment, the term "far away" means about more than two miles.

It is understood that a variety of checks can be made using many types of criteria to determine the bounds on errors in the altitude estimation process. In particular, the ratio of CPA to present range (CPA/R) should be relatively small for the altitude estimate to be accurate. In cases when CPA/R is somewhat larger, and the estimate may be poor, it may still be possible to reliably declare the contact to be airborne. It will be appreciated that a reliable classification of a contact as airborne may be important in certain applications.

As another check, the value (described below) of the computed cross line of sight distance during TCPA can be checked to prevent the altitude estimate from involving a square root of a negative number. Generally, one can check for CPA being much larger than the estimate of X.

As described above, the inventive methods of altitude estimation are based on the CPA:

$$h = \sqrt{CPA^2 - X^2}$$

This can be reduced to estimating the value of X=the cross line of sight distance during TCPA.

The value X can be estimated from the available sensor coordinates using a variety of techniques, as described below. Note that for motion across the line of sight due both to target motion and to sensor motion (when on a moving platform) should be taken into account. In the embodiments described below, it is useful to understand how to compute the Cross Line of Sight Vector. In cartesian coordinate systems, the tracking filter produces an estimate of the contact position $P^T(x,y)$ and velocity $V^T=(x',y')$ The Line Of Sight vector is $L=(P^T-P)$, where P is the sensor location in this space.

The unit Line Of Sight vector U is L normalized by its own length:

$$U = \frac{L}{\|L\|} = \frac{(P^T - P)}{\sqrt{(P^T - P) \cdot (P^T - P)}}$$

When the sensor is on a moving platform, during the time interval of TCPA, the induced cross line of sight distance $X^S$ of the sensor is $X^S$=(Sensor Speed−V·U)TCPA, where V is the velocity vector of the sensor. By subtracting the component of sensor velocity in the line of sight direction and subtracting it from total sensor speed, one has the component of sensor speed in the cross line of sight direction. Multiplying by TCPA gives the distance traveled.

In cases of concern, either the sensor is stationary so $X^S$ is 0, or the sensor platform has a navigation system with sufficiently accurate measurements to allow determination of $X^S$ with adequate confidence. Rough weather can contribute to error fluctuations in navigation data so that the altitude estimation logic should check for sufficiently smooth conditions.

In one embodiment, if the radar system tracking filter works in the natural (polar or radar) coordinates R (range) and A (azimuth), it will generate estimates of the rates of change in R and A denoted R' (range rate of change) and A' (azimuth rate of change). In this case, the cross line of sight component of velocity due to contact motion is: C=RA'.

Note that there is a choice of signs that is irrelevant to the present application. One can then define a contact cross line of sight distance during TCPA as $X^T$:

$$X^T = CTCPA = R|A'|TCPA$$

This embodiment may be preferred in certain applications since, for many sensor systems, the noises in range measurement and azimuth measurement are independent. In particular, on a moving platform, navigation sensors correct azimuth A for ownship motion but do not influence the range value R. Then $X=X^T+X^S$.

In another embodiment, $X=X^T+X^S$ is obtained but A' is not available while $V^T=(x',y')$ is available. In this case, one knows the Line Of Sight unit vector U=(u1, u2), so one can compute the cross line of sight unit vector Y=±(u2,−u1). Note that there is a choice of signs that is irrelevant, but should be made consistently. Then $X^T=CTCPA$, where $C=|V^T \cdot Y|$.

As previously noted, in this implementation certain limitations should be taken into account in view of various error and noise components mixing among the measurements of range, true azimuth, navigation sensors, x, y, x', and y'.

EXAMPLE

Estimating an altitude for a contact detected in a 2 D radar system can be simulated as described below. Exemplary parameters for a first scenario, which can be referred to as 'high and fast', are set forth below. Positions for ownship and target are specified in x and y coordinates for a plot time of 180 seconds.

xOwnship=3000 ship x position
yOwnship=2700 ship y position
shipSpeed=10 ship speed
shipcourse=45 degrees ship course
xTarget0=11500 target x position
yTarget0=11200 target y position
a=1500 target altitude
targetSpeed=100 target speed
targetCourse=−145 degrees target course Positions for the target and radar can be specified in vector format as set forth below:

Vradar={shipSpeedSin[shipCourse], shipSpeedCos[shipCourse], 0.};
Vtarget={targetSpeedSin[targetCourse], targetSpeedCos[targetCourse],
Pradar0={xOwnship0, yOwnshipo, 0.};
Ptarget0={xTarget0, yTarget0, a};
Plos0=Ptarget0−Pradar0;
Pradar [t]=Pradar0+tVradar;
Ptarget [t]=Ptarget0+tVtarget;

The initial range of the target from the radar can be specified as:

Initial range=$r0=\sqrt{Plos0 \cdot Plos0}$=12,114m

Depending upon the desired range, a target this far away may not be considered a threat.

Figure 4:
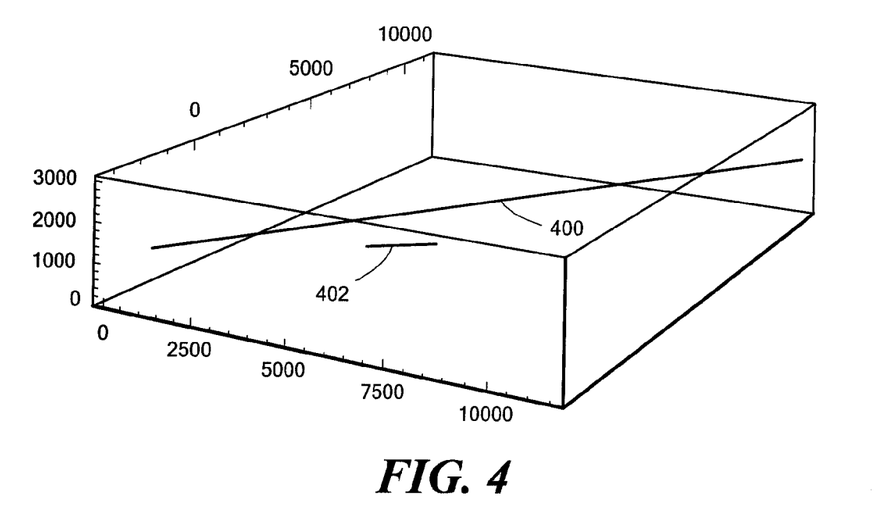
FIG. 4 is a three dimensional depiction of the motion history of an airborne contact and a radar aboard a surface ship, both holding their velocity constant throughout the period of the simulation.
Figure 5:
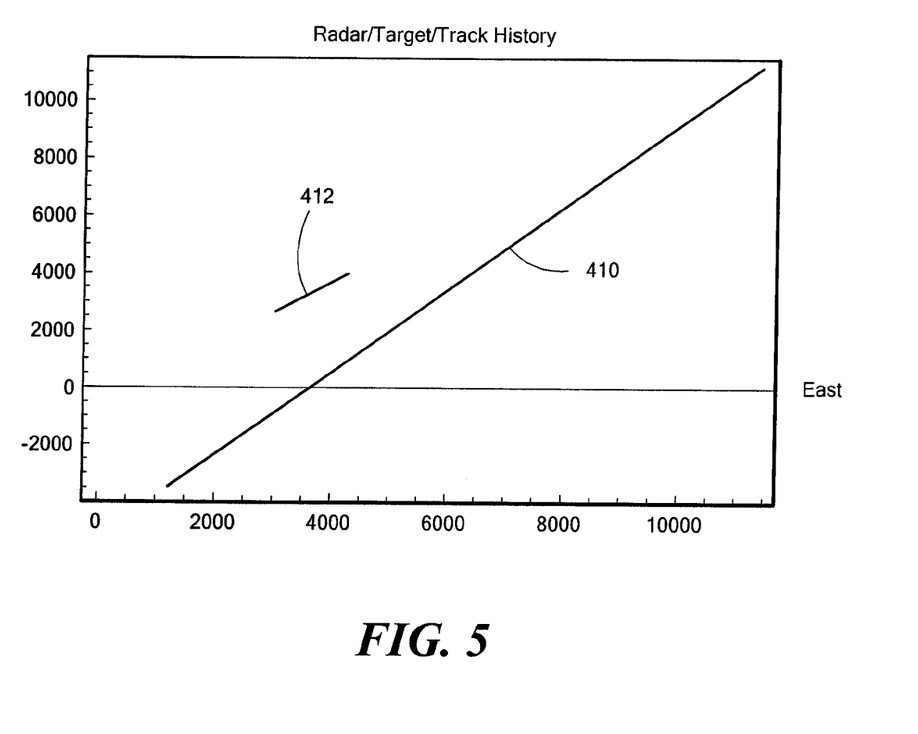
FIG. 5 is the rendering of FIG. 4 by projecting the z-coordinate into the x,y-plane.
Figure 6:
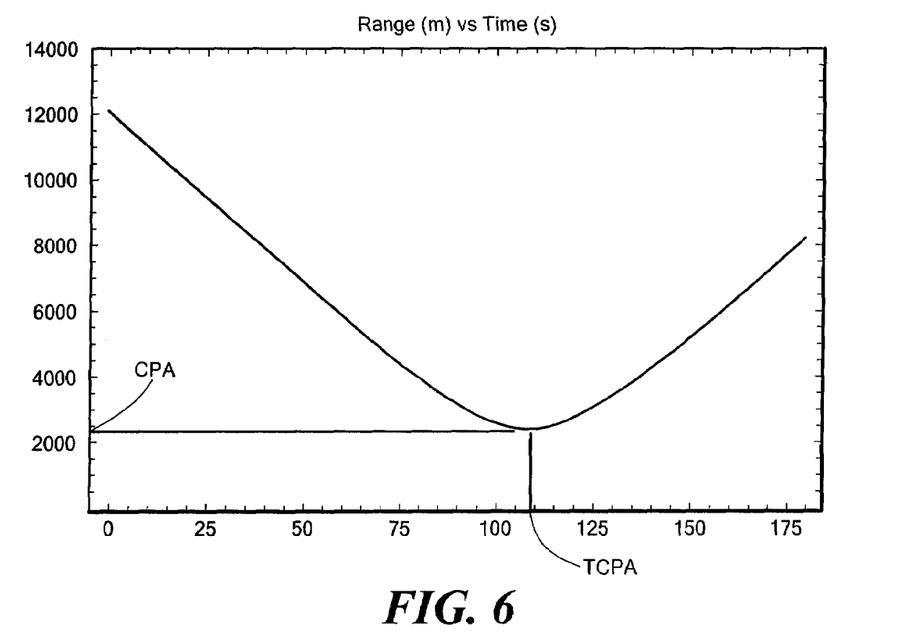
FIG. 6 shows how the range from the radar to the airborne contact changes with time during the scenario depicted in FIG. 4 and FIG. 5 and also shows the time (TCPA) at which the range is a minimum and the minimum range (CPA).
Figure 7:
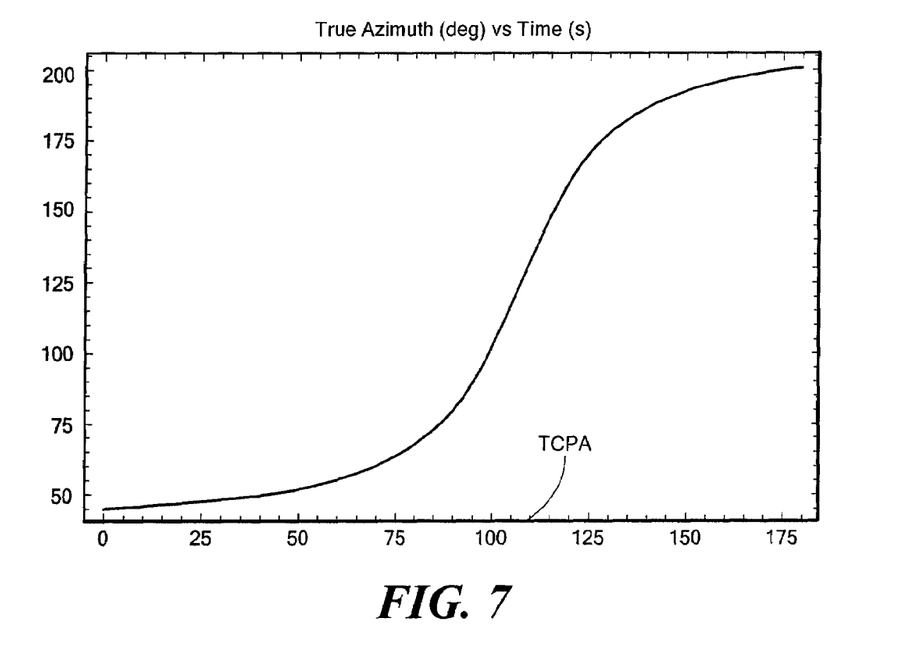
FIG. 7 shows how the true azimuth (or bearing) from the radar to the airborne contact will appear to vary in the scenario of FIG. 4, FIG. 5, and FIG. 6, where this azimuth change as a function of time is different from the same function for a surface contact following the same projected track in the x,y-plane.

FIG. 4 shows an exemplary 3 D representation of a simulated target (aircraft) track 400 along with sensor motion 402 based upon the parameters set forth above. Position is shown in x, y, z coordinate space. FIG. 5 shows a 2 D radar/track history for the aircraft 410 and the sensor 412. FIG. 6 shows graphically shows range versus time for the target from which CPA and TCPA can be seen. As noted above, the CPA is at a local minima for the range/time track. FIG. 7 shows true azimuth in degrees versus time for the target. Note that true azimuth changes dramatically proximate the TCPA.

Figure 8:
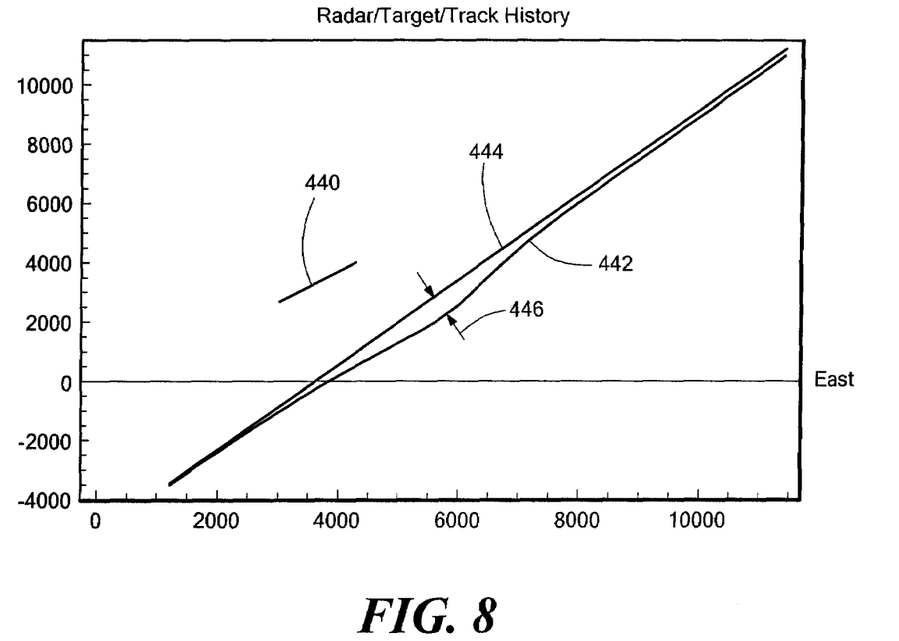
FIG. 8 depicts the difference in the projected view of the radar's measured path of the airborne contact from the true straight line path, where the apparent curvature is due to false accelerations measured by the 2D radar from the altitude of the airborne contact.

FIG. 8 shows a 2D radar track history for the simulation including a sensor track 440, a target track 442, and a target track 444 for the target if the altitude was the same as the sensor. As can be seen, there is a bulge 446 corresponding to cross line of sight distance for the target due to the target altitude.

The calculated cross line of sight distance is 8.31461 meters and the estimated altitude is 1501.29 meters. The cross line of sight distance is equal to the TCPA times the ship's speed minus the line-of-sight component of velocity of the radar, as set forth below:

$$xLOSmotion = TCPA(\text{ship Speed} - Vradar \cdot Plos0/\sqrt{Plos0 \cdot Plos0})$$

where $Plos0/\sqrt{Plos0 \cdot Plos0}$ provides a unit vector for the line of sight position (target position minus the radar position)

The altitude estimate is computed as:

$$\text{estimated target altitude} = \sqrt{CPA^2 - (TCPA|\alpha RateTrue[0.]|r0 + xLOSmotion)^2}$$

where $\alpha RateTrue[t] = \alpha'[t]$, and $\alpha[t] = ArcTan[Plos[t][[2]], Plos[t][[1]]]$, where [[1]] and [[2]] correspond to the x- and y-coordinates, respectively, of the line-of-sight vector.

EXAMPLE TWO

In a second scenario set forth below, the target comes closer to the ship. Parameters for the simulation are set forth below.
xOwnship=3000;
yOwnship0=2700;
shipSpeed=10;
shipcourse=45 degrees
xTarget0=11500;
yTarget0=11200;
a=500;
targetSpeed=100;
targetCourse=−138 degrees;
plot time:: 180

Figure 9:
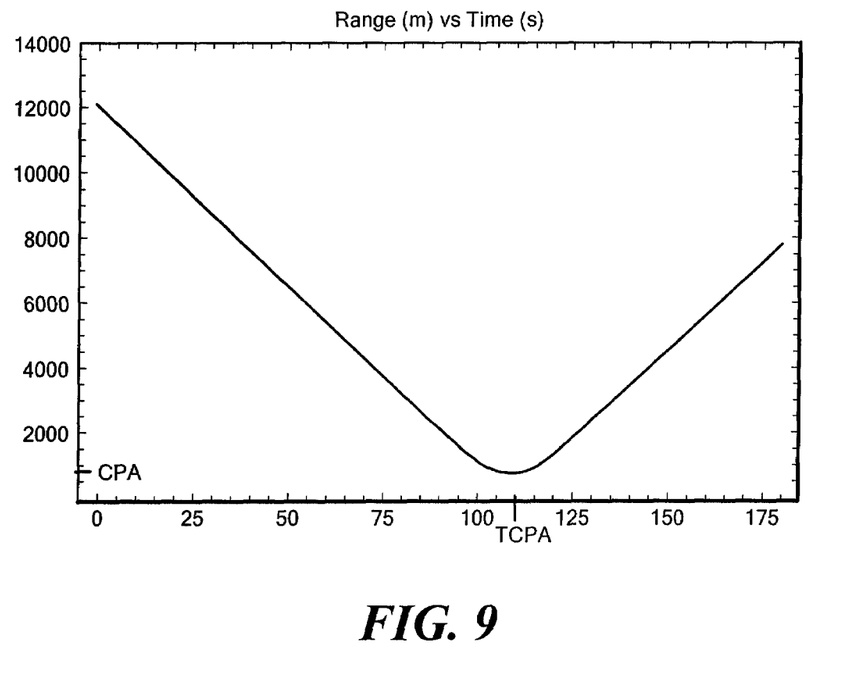
FIG. 9 is similar to FIG. 6 for a lower aircraft.

The target and radar positions can be set forth in vector format as set forth below:
Vradar:={shipSpeed Sin [shipCourse], shipSpeed Cos [shipCourse], 0.};
Vtarget:={targetSpeed Sin [targetCourse], targetSpeed Cos [targetCourse], 0};
Pradar0:={xOwnship0, yOwnship0, 0.};
Ptarget0:={xTarget0, yTarget0, a};
Plos0=Ptarget0−Pradar0;
Pradar[t_]:=Pradar0+tVrada;
Ptarget [t_]:=Ptarget0+tVtarget;
Initial range=r0=$\sqrt{Plos0 \cdot Plos0}$=12031.2 m As can be seen in FIG. 9, the TCPA is about 109 seconds, which is less than two minutes, and the CPA is about 761 meters. This target may be considered a threat depending upon the selected parameters and checks defining what targets are considered threats and which are not.

The cross line of sight motion is 0.943 meters which results in an estimate altitude of about 499.1 meters.

Figure 10:
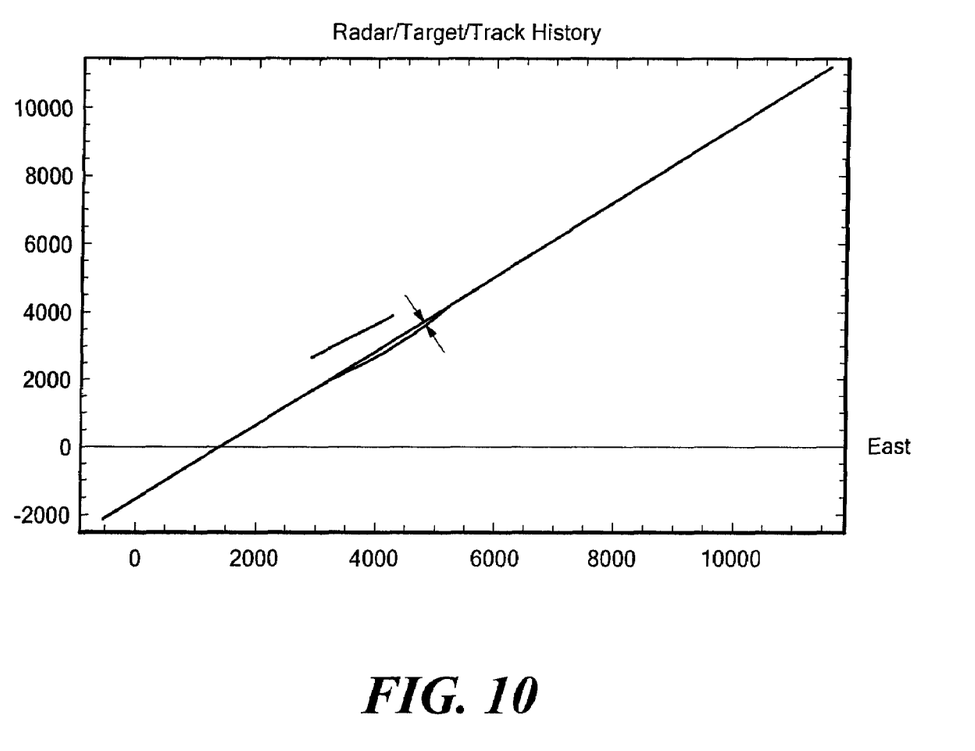
FIG. 10 is similar to FIG. 8 for a lower aircraft.

FIG. 10 shows a radar target track history in which the bulge 500 is smaller than the bulge for the first example since the altitude is less.

It is understood that the inventive embodiments described above can be used in a system in which other coordinate conversions have taken place. However, such embodiments should take into account such coordinate conversions involving additional error fluctuations (e.g., noises) and the mixing of such noises. While such other coordinates can be transformed into the coordinates schemes described above, altitude estimation will still be useful, but perhaps over a more limited set of dynamic geometries between the sensor and the contact. For example, one system is the mention systems in which locations are given in geodetic coordinates of Latitude, Longitude, and Altitude.

It is understood that the exemplary embodiments contained herein are primarily shown and described in conjunction with maritime radars and low, slow aircraft threats to shipping. However, one of ordinary skill in the art will recognize that the inventive techniques are applicable to any two-dimensional tracking system for which it would be desirable to obtain a three-dimensional location on a closing contact. For example, sonar applications may benefit from the exemplary embodiments taking into account limitations due to the diffraction of sound waves in water with varying temperatures with depth. Other applications include Electronic Support Measures (ESM) Systems and Interrogate Friend or Foe (IFF) systems.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
tracking a contact using a sensor in a two-dimensional radar system;
determining a closest point of approach (CPA) for the contact;
determining a time to closest point of approach (TCPA) for the contact;
estimating an altitude for the contact from the closest point of approach (CPA) and a cross line of sight distance during the time to closest point of approach (TCPA).

2. The method according to claim 1, further including determining whether the contact is airborne.

3. The method according to claim 1, wherein the estimated contact altitude equals the CPA when the contact is following a constant velocity that leads directly over the radar system sensor.

4. The method according to claim 1, further including using the Pythagorean Theorem to estimate the contact altitude.

5. The method according to claim 1, further including using a negative TCPA as a criterion to determine when an altitude should be estimated for the contact.

6. The method according to claim 1, further including making a series of checks prior to estimating the contact altitude.

7. The method according to claim 6, wherein the checks include one or more of determining whether the contact is a closing contact, determining whether the TCPA is less than a selected value, determining whether the CPA is less than a selected value, and examining a ratio of CPA to range for the contact.

8. The method according to claim 1, further including estimating the contact altitude from a contact range (R) and a rate of change in azimuth (A').

9. The method according to claim 1, further including estimating the contact altitude by using a cross line of sight vector for the contact.

10. A system, comprising:
   a two-dimensional radar system having a sensor to detect contacts; and
   a processing module to track a contact using a sensor in a two-dimensional radar system, determine a closest point of approach (CPA) for the contact, determine a time to closest point of approach (TCPA) for the contact, and estimate an altitude for the contact from the closest point of approach (CPA) and a cross line of sight distance during the time to closest point of approach (TCPA).

11. The system according to claim 10, wherein the processing module determines whether the contact is airborne.

12. The system according to claim 10, wherein the estimated contact altitude equals the CPA when the contact is directly over the radar system sensor.

13. The system according to claim 10, wherein the processing module makes a series of checks prior to estimating the contact altitude.

14. The system according to claim 10, wherein the system includes a ship.

15. An article comprising:
   a storage medium having stored thereon instructions that when executed by a machine result in the following:
   tracking a contact using a sensor in a two-dimensional radar system;
   determining a closest point of approach (CPA) for the contact;
   determining a time to closest point of approach (TCPA) for the contact;
   estimating an altitude for the contact from the closest point of approach (CPA) and a cross line of sight distance during the time to closest point of approach (TCPA).

16. The article according to claim 15, further including instructions for determining whether the contact is airborne.

17. The article according to claim 15, wherein the estimated contact altitude equals the CPA when the contact is directly over the radar system sensor.

18. The article according to claim 15, further including instructions for using a negative TCPA as a criterion to determine when an altitude should be estimated for the contact.

19. The article according to claim 15, further including instructions for making a series of checks prior to estimating the contact altitude, wherein the checks include one or more of determining whether the contact is a closing contact, determining whether the TCPA is less than a selected value, determining whether the CPA is less than a selected value, and examining a ratio of CPA to range for the contact.

20. The article according to claim 15, further including instructions for estimating the contact altitude from a contact range (R) and a rate of change in azimuth (A') and/or using a cross line of sight vector for the contact.

* * * * *

UNITED STATES PATENT AND TRADEMARK OFFICE
CERTIFICATE OF CORRECTION

PATENT NO. : 7,417,583 B2
APPLICATION NO. : 11/554064
DATED : August 26, 2008
INVENTOR(S) : Wood et al.

It is certified that error appears in the above-identified patent and that said Letters Patent is hereby corrected as shown below:

Front Page, line 54, delete "...Two Dimensional..." and replace with
-- ...Two-Dimensional... --.

Col. 1, Title, delete "...Two Dimensional..." and replace with
-- ...Two-Dimensional... --.

Col. 2, line 10-11, delete "with exemplary" and replace with -- with an exemplary --.

Col. 2, line 17, delete "three dimensional" and replace with -- three-dimensional --.

Col. 2, line 62, delete "(FOIR)" and replace with -- (EOIR) --.

Col. 3, line 35, delete "two dimensional" and replace with -- two-dimensional --.

Col. 3, line 64, delete "and" and replace with -- an --.

Col. 4, line 3, delete "of particular" and replace with -- of a particular --.

Col. 4, line 15, delete "than" and replace with -- that --.

Col. 4, line 35, delete "$R^1$" and replace with -- $R'$ --.

Col. 4, line 37, delete "...·D(t)..." and replace with -- ...·D′(t)... --.

Col. 5, line 35, delete "$P^T$(x,y) and velocity $V^T=(x^1,y^1)$" and replace with -- $P^T=(x,y)$ and velocity $V^T=(x^1,y^1)$. --.

Col. 6, line 17, delete "$C=|V^T·Y|$" and replace with -- $C=|V^T·Y|$. --.

Col. 6, line 47, delete "..., yOwnshipo,..." and replace with -- ..., yOwnship0,... --.

Col. 6, line 64-65, delete "shows graphically shows range" and replace with -- shows graphically range --.

UNITED STATES PATENT AND TRADEMARK OFFICE
CERTIFICATE OF CORRECTION

PATENT NO. : 7,417,583 B2
APPLICATION NO. : 11/554064
DATED : August 26, 2008
INVENTOR(S) : Wood et al.

It is certified that error appears in the above-identified patent and that said Letters Patent is hereby corrected as shown below:

Col. 7, line 18, delete "position)" and replace with -- position). --.

Col. 7, line 34, delete "degrees" and replace with -- degrees; --.

Col. 7, line 50, delete "...tVrada;" and replace with -- ...tVradar; --.

Signed and Sealed this

Sixteenth Day of June, 2009

JOHN DOLL
*Acting Director of the United States Patent and Trademark Office*